(12) United States Patent
Jacobs et al.

(10) Patent No.: US 7,804,629 B2
(45) Date of Patent: Sep. 28, 2010

(54) SYSTEM AND METHOD FOR ESTIMATING TONER USAGE FOR A PRINTING SYSTEM

(75) Inventors: William Samuel Jacobs, Los Angeles, CA (US); Michael E. Farrell, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 718 days.

(21) Appl. No.: 11/374,868

(22) Filed: Mar. 14, 2006

(65) Prior Publication Data
US 2007/0216930 A1 Sep. 20, 2007

(51) Int. Cl.
H04N 1/46 (2006.01)
H04N 1/21 (2006.01)
H04N 1/23 (2006.01)
G06K 5/12 (2006.01)

(52) U.S. Cl. .................. 358/504; 358/406; 358/1.7; 358/296

(58) Field of Classification Search .................. 358/1.9, 358/1.14, 1.16, 1.7, 296, 300, 305, 406, 504
See application file for complete search history.

(56) References Cited

U.S. PATENT DOCUMENTS

| | | | | |
|---|---|---|---|---|
| 4,992,882 A | * | 2/1991 | Ikenoue et al. | 358/300 |
| 4,992,958 A | * | 2/1991 | Kageyama et al. | 358/1.17 |
| 5,058,037 A | * | 10/1991 | Kageyama et al. | 358/1.17 |
| 5,204,699 A | | 4/1993 | Birnbaum et al. | |
| 5,268,993 A | * | 12/1993 | Ikenoue et al. | 358/1.15 |
| 5,349,377 A | | 9/1994 | Gilliland et al. | |
| 5,383,129 A | | 1/1995 | Farrell | |
| 5,533,175 A | * | 7/1996 | Lung et al. | 358/1.16 |
| 5,592,298 A | | 1/1997 | Caruso | |
| 5,604,578 A | | 2/1997 | Shibuya et al. | |
| 5,655,174 A | | 8/1997 | Hirst | |
| 5,680,521 A | * | 10/1997 | Pardo et al. | 358/1.13 |
| 5,731,879 A | * | 3/1998 | Maniwa et al. | 358/296 |
| 5,732,198 A | * | 3/1998 | Deppa et al. | 358/1.15 |
| 5,734,801 A | | 3/1998 | Noguchi et al. | |
| 5,838,333 A | | 11/1998 | Matsuo | |
| 5,859,711 A | * | 1/1999 | Barry et al. | 358/296 |
| 5,867,198 A | | 2/1999 | Gwaltney et al. | |
| 5,954,436 A | * | 9/1999 | Kageyama et al. | 400/188 |
| 5,978,553 A | * | 11/1999 | Ikeda | 358/1.9 |
| 5,999,710 A | * | 12/1999 | Smith et al. | 358/1.15 |
| 6,151,134 A | * | 11/2000 | Deppa et al. | 358/1.15 |
| 6,160,968 A | * | 12/2000 | Noda | 399/8 |
| 6,163,334 A | * | 12/2000 | Irie et al. | 347/249 |
| 6,167,214 A | | 12/2000 | Scheuer et al. | |
| 6,172,765 B1 | * | 1/2001 | Kawamoto | 358/1.2 |
| 6,219,153 B1 | * | 4/2001 | Kawanabe et al. | 358/1.16 |
| 6,324,356 B1 | * | 11/2001 | Inoue | 399/39 |
| 6,348,971 B2 | * | 2/2002 | Owa et al. | 358/1.15 |
| 6,348,975 B1 | * | 2/2002 | Tsunekawa et al. | 358/1.17 |

(Continued)

Primary Examiner—James A Thompson
(74) Attorney, Agent, or Firm—Carter, DeLuca, Farrell & Schmidt, LLP

(57) ABSTRACT

A method for determining a toner usage estimate for a print job to be performed by a printing system having at least one print engine and at least one controller includes determining a set of print conditions for the print job and selecting a set of parameters associated with the print conditions. The method further includes estimating a total amount of toner usage for each of the print job's pages. The set of parameters may include image rendering, job dependent and engine dependent parameters.

19 Claims, 4 Drawing Sheets

U.S. PATENT DOCUMENTS

| | | | |
|---|---|---|---|
| 6,356,359 B1* | 3/2002 | Mostamed | 358/1.8 |
| 6,364,452 B1* | 4/2002 | Noyes et al. | 347/43 |
| 6,404,507 B1* | 6/2002 | Hamamoto et al. | 358/1.5 |
| 6,456,387 B1* | 9/2002 | Pardo et al. | 358/1.13 |
| 6,516,160 B1 | 2/2003 | Rodriguez | |
| 6,574,443 B1 | 6/2003 | Butikofer et al. | |
| 6,611,347 B1* | 8/2003 | Okada et al. | 358/1.15 |
| 6,633,401 B1 | 10/2003 | Kojima | |
| 6,781,709 B2* | 8/2004 | Nozawa | 358/1.12 |
| 6,801,334 B1* | 10/2004 | Enomoto | 358/1.18 |
| 6,810,218 B1* | 10/2004 | Wong et al. | 399/27 |
| 6,856,430 B1* | 2/2005 | Gase | 358/1.9 |
| 6,862,110 B2 | 3/2005 | Harrington | |
| 6,895,193 B2* | 5/2005 | Takamatsu et al. | 399/27 |
| 6,903,836 B2 | 6/2005 | Meade, II et al. | |
| 6,977,752 B1* | 12/2005 | Barry et al. | 358/1.9 |
| 6,992,791 B2* | 1/2006 | Walmsley et al. | 358/1.18 |
| 7,093,989 B2* | 8/2006 | Walmsley et al. | 400/62 |
| 7,099,027 B1* | 8/2006 | Barry et al. | 358/1.15 |
| 7,116,444 B2* | 10/2006 | Barry et al. | 358/1.9 |
| 7,242,487 B2* | 7/2007 | Lucivero et al. | 358/1.13 |
| 7,256,913 B2* | 8/2007 | Jacob et al. | 358/1.9 |
| 7,398,029 B2* | 7/2008 | Jacobsen et al. | 399/79 |
| 2003/0043401 A1* | 3/2003 | Abel et al. | 358/1.14 |
| 2004/0125391 A1* | 7/2004 | Zuber | 358/1.9 |
| 2004/0218936 A1* | 11/2004 | Dougherty et al. | 399/27 |
| 2004/0220779 A1* | 11/2004 | Fukao | 702/188 |
| 2005/0063000 A1* | 3/2005 | Silverbrook et al. | 358/1.14 |
| 2005/0195422 A1* | 9/2005 | Baez et al. | 358/1.14 |
| 2007/0153311 A1* | 7/2007 | Carling et al. | 358/1.13 |
| 2007/0159647 A1* | 7/2007 | Carling et al. | 358/1.12 |
| 2008/0013113 A1* | 1/2008 | Gonzalez et al. | 358/1.5 |
| 2008/0131148 A1* | 6/2008 | Wong | 399/27 |
| 2008/0137110 A1* | 6/2008 | Mestha et al. | 358/1.9 |
| 2008/0151304 A1* | 6/2008 | Matsugashita | 358/1.18 |

* cited by examiner

SYSTEM AND METHOD FOR ESTIMATING TONER USAGE FOR A PRINTING SYSTEM

BACKGROUND

The present disclosure relates to printing systems, and more specifically, to a system and method for estimating the amount of toner required for a print job.

When pricing a print job, print shops must be able to estimate the needed consumables and expenses, e.g., paper sheets, binding tape, periodic printer maintenance and shipping. In any print process, a key cost component is the marker used to generate the prints. In the case of xerographic printing, this marking material, toner, can be a significant factor in determining the overall expense of producing the print job.

Inaccurate toner usage estimation may negatively impact print shops in a variety of ways. If the shop underestimates the amount of toner needed to print a job, job production costs will exceed the estimate and the shop may lose money. Alternatively, if the shop overestimates the amount of toner needed to print a job, its pricing may be high, causing it to lose the job to a competitor.

An accurate toner estimation tool must comprehend numerous factors. Actual toner consumption will vary from one job to another (i.e., different types and amounts of toner will be applied to each individual page). Moreover, the same print job printed using two different print controllers or different print engines will yield a different result. Numerous system level factors can impact overall toner consumption, e.g., the use of banner pages, wastage associated with damaged or unbillable copies, and such printer-related functions as purging. Neglecting any of these considerations will reduce estimation accuracy.

Therefore, what is needed is a system and method for estimating toner usage that takes into account all of the aforementioned factors.

SUMMARY

According to the present disclosure a method for determining a toner usage estimate for a print job to be performed by a printing system having at least one print controller and at least one print engine is provided. The method includes determining a set of print conditions for the print job. The method also includes selecting a set of parameters associated with the print conditions. The method further includes estimating a total amount of toner usage for at least one page. The set of parameters may include image rendering, job dependent and engine dependent parameters.

The present disclosure also provides a computer-readable storage medium storing a set of instructions capable of being executed by at least one processor of a printing system having a memory. The set of instructions are executed for determining a set of parameters that influence toner usage for a print engine of the printing system, adjusting and analyzing at least one page in accordance with the set of parameters and estimating a total amount of toner usage for the at least one page.

The present disclosure also provides a printing system for estimating toner usage. The system includes selecting a print system and a printing behavior to be modeled. The system also includes determining a set of parameters that influence toner usage for the selected print system and printing behavior, analyzing the set of parameters to determine which parameters are most relevant for a particular print controller or print engine and utilizing the set of parameters to create a toner usage model.

BRIEF DESCRIPTION OF THE DRAWINGS

Various embodiments of the present disclosure will be described herein below with reference to the figures wherein.

DETAILED DESCRIPTION

The word "printer" and the term "printing system" as used herein encompass any apparatus and/or system, such as a digital copier, xerographic and reprographic printing systems, bookmaking machine, facsimile machine, multi-function machine, ink-jet machine, continuous feed, sheet-fed printing device, etc. which may contain a print controller and a print engine and which may perform a print outputting function for any purpose. The word "tool" as used herein may encompass hardware, software or a set of instructions for performing the system and method described herein.

Figure 1:
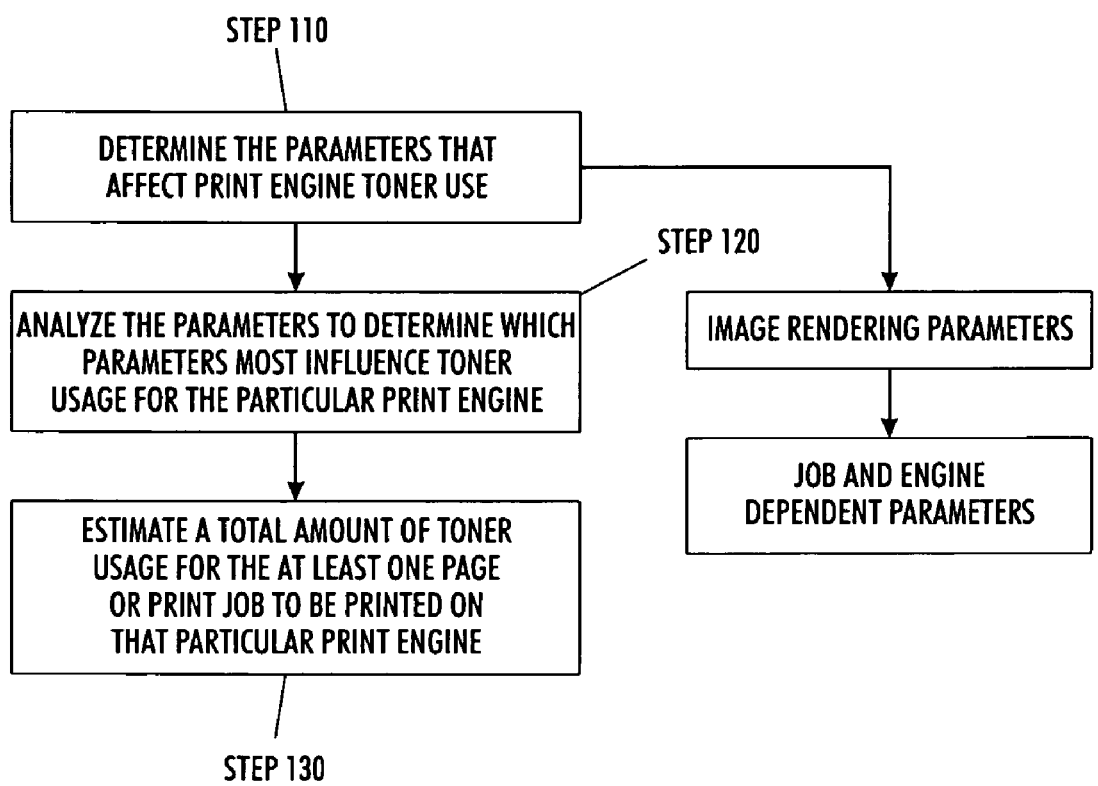
FIG. 1 is a flow chart of the present disclosure showing a method for estimating toner usage for a printing system.

Referring now to the drawings, the method of the present disclosure estimates the toner usage of a print job to be performed by a printing system having at least one print engine. FIG. 1 shows a flow chart in accordance with this embodiment. The method includes determining a set of parameters that influence toner usage for a print engine of the printing system (STEP 110). These parameters may include image rendering, job dependent and engine dependent parameters and will be discussed in greater detail below. The parameters are analyzed to determine which parameters most influence toner usage (STEP 120). Once analyzed, the total amount of toner usage for at least one page of a print job is estimated (STEP 130).

Figure 2:
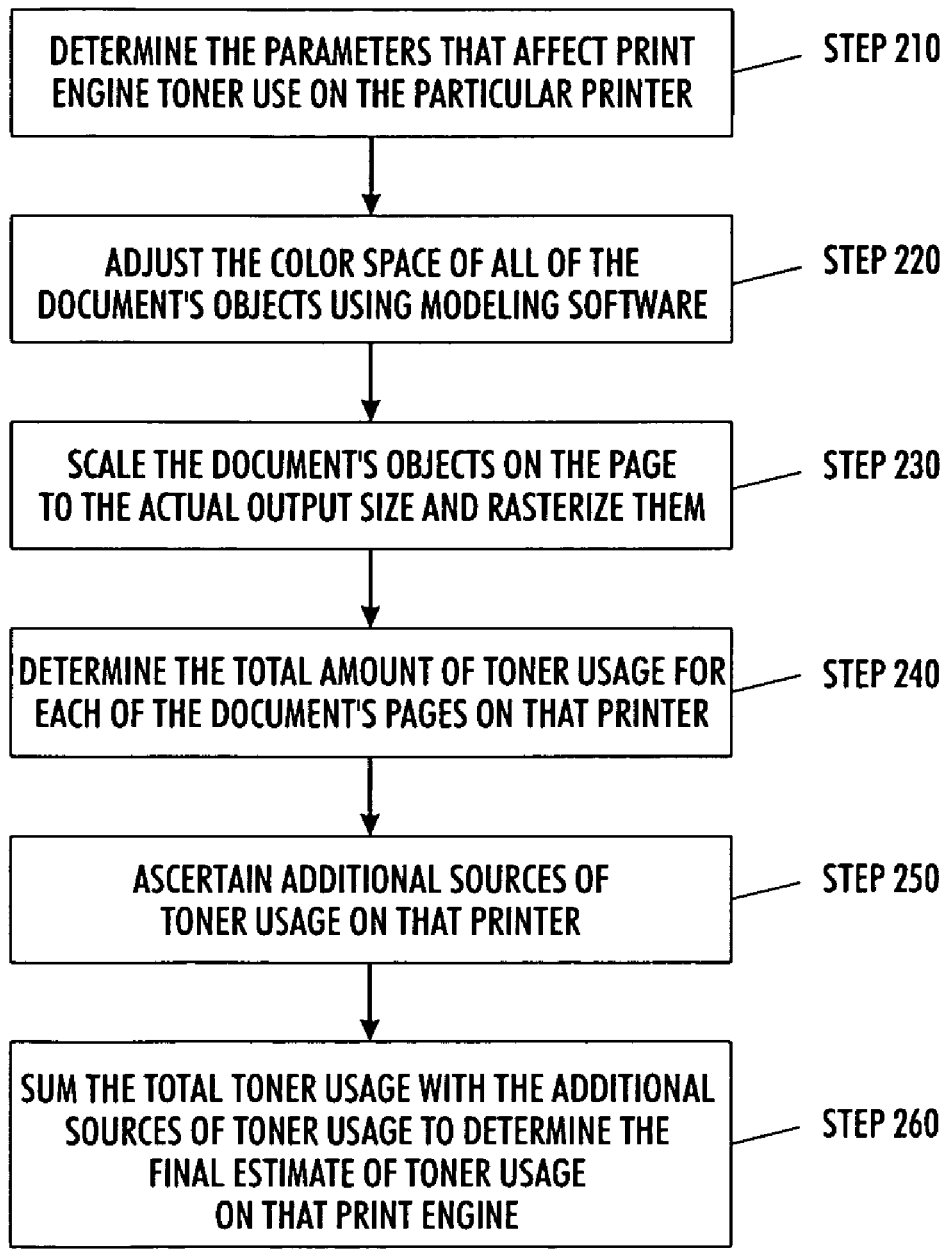
FIG. 2 is a flow chart of the present disclosure showing a method for estimating client side toner usage for a print job to be performed by a printing system.

In one embodiment, the method of the present disclosure models a plurality of factors that can impact a print job's toner consumption and estimates the total amount of toner usage for performing a print job using a specific printing system. The factors include but are not limited to the print job itself, and the manner in which the print job will be processed by the target print controller and print engine and various system level printer features of the printing system. FIG. 2 discloses a flow chart in accordance with this embodiment of the present disclosure.

In advance, specific information about the specific characteristics of the printer controller and print engine applicable across all print submissions is gathered (STEP 210). When estimating toner usage for a specific print job, the submission is analyzed into appropriate components which are then mapped to actual print engine usage to determine the toner amounts to be consumed. The result predicts or estimates the amount of toner needed to print a specific print job via a specific print controller on a specific print engine.

Examples of parameters that may influence print engine toner use include, but are not limited to, such xerographic process controls as toner purging (described in more detail below), photoreceptor position tracking (uses image registration indicia created using toner to monitor the interdocument zone), trapping (the intentional overlapping of colors along common boundaries to prevent unprinted paper from showing in the event of misregistration in printing), antialiasing (refers to a technique used in generating a grey-scale or color bitmap image whereby diagonal edges are made to appear smoother by setting pixels near the edge to intermediate colors according to where the edge crosses them), pitch mode (varies depending upon the paper size), simplex (one-sided) vs. duplex (two-sided), etc. For each print controller and print engine to which files can be submitted, one useful factor may include determining how at least one page having a color space (e.g., text, line art, vector graphics and raster images) will be halftoned by the specific printer or printing system. Moreover, the toner amount consumed by the at least one page must be determined as well as the set of parameters that influence print engine toner use.

There are two types of parameters that must be differentiated. Image rendering parameters and job or engine dependent parameters. Image rendering parameters may include, but are not limited to, halftoning, color space adjustment, trapping, antialiasing, scaling, etc. Alternatively, job dependent and engine dependent parameters may include, but are not limited to, simplex vs. duplex, banner pages, toner purging, calibrations copies and wastage.

It should be noted that all of these factors are not equally important and may vary with different printers and printing systems. Each specific print controller or print engine will have different characteristics. For example, antialiasing and trapping might have a great impact upon a particular print controller or print engine, however, if the document that needs to be printed consists of high resolution raster images that will not need to be antialiased or trapped, these factors lose their importance. If the specific characteristics of a particular machine are known and included in the toner estimation process, a more accurate final estimate of toner can be modeled for a particular printer. Moreover, it is envisioned and within the scope of the present disclosure for the techniques described herein to apply to object level modeling as well. Examples of object level modeling could include different color management by object types, i.e., text and graphics would get a different default rendering intent than images.

Different printers will print the same CMYK or monochrome values pixel with different toner amounts. The same printer can print the same CMYK pixels differently based upon the pixels' object type and the object type's associated halftone screen. The same print engine fronted by different print controllers can yield different toner usage. This requires an advance determination of the print controller and print engine treatment of different object types so that once the pixels' object type is known, the amount of toner to be used were one to actually print the pixels can be determined.

In this embodiment, the color space of at least one page may be adjusted using software that models the actual way in which the target printer controller will render the objects in the file (STEP 220). Examples of possible color spaces include but are not limited to CMYK and monochrome. This step ensures that the monochrome or CMYK pixels accurately reflect what the target print controller and print engine will receive. In order to achieve this, the conversion of submitted input must be processed to the output color space in the same manner as these devices would process it. Conversion algorithms differ widely across print controllers and print engines. Therefore, simply converting all inputs to device CMYK or monochrome is insufficient. Rendering features such as support for rich black versus pure black, maximum toner coverage, under color removal (UCR), gray component replacement (GCR), and the application of TRC's (i.e., those designed by a user as well as TRC's applied for any other reason, such as, to emulate another printing device or print look) must be accounted for. Any possible effects arising from printer emulation may be applied at this step as well. While such a function can target an output profile (e.g., SWOP), it does not comprehend the other device specific characteristics. Therefore, the results of such rendering often diverge from that of the target devices. In some cases, one way in which to implement this step is by means of a color modeling engine.

This embodiment further includes scaling the page to an actual output size and using a raster image processor to preserve information about the page or at least one object type generating the pixels (STEP 230). It is envisioned that the raster image processor may "rasterize" to less than full print resolution. This step comprehends possible divergence between the generally assumed default image size (e.g., in the case of a PDF file, that of default media box) and the actual printed image size. Generally, the greater the number of pixels, the more toner will be consumed. Therefore, should the actual printed image size be smaller or larger than the default, the image must be scaled. An accurate estimation requires that such pixel stretching or compression be fully understood. A reduced resolution raster image may force the user to choose between accuracy and performance. The higher the resolution the more pixels need to be generated and examined, but with more fidelity to the actual results. It should be noted that as part of the rasterization process, the generated pixels are tagged to indicate their object type, information that is critical to the actual toner usage computation.

According to this embodiment, the total toner usage for each page must be determined (STEP 240). This includes determining the toner usage associated with each page image (the byte map of the entire printed page). The following information must be determined for an accurate estimation of the toner usage associated with each page image: the types of objects generating the pixels, the pixels' device CMYK or monochrome values and using the print controller and print engine parameters obtained above determine how much toner will be used to print the pixels of that object type when they are halftoned via this print controller and print engine. These calculations may incorporate both dot gain and edge effects.

As mentioned hereinabove an accurate estimation of the total toner usage for each page must also take into account the toner usage not associated or proportional with each page image (i.e., used for xerographic process controls such as toner purging, photoreceptor position tracking, etc.). More specifically, it is necessary to determine the print engine pitch of the page, the toner usage for the print engine pitch mode and any necessary toner purging based upon the total print coverage. This step determines the toner needed to print the raster images but which is not used in the printing of the raster images. As a routine part of their print process, certain print engines consume toner to preserve correct functionality. For example, certain devices have a requirement for periodic system toner flushing when the toner becomes stale. The occurrence of such flushing is determined by a range of factors, e.g., average age of toner in the developer sump. This again denotes the importance of determining a set of parameters that influence print engine toner use for a specific print engine.

Purge While Run (PWR) and Automatic Toner Purge (ATP) are two specific types of toner purging associated with certain devices. In PWR toner purging, toner patches are placed on the photoreceptor outside the area used by the customer image. The patches are not transferred to paper and are cleaned off by the photoreceptor cleaning system. This behavior is situational and is triggered by the average age of toner in the developer sump exceeding a threshold, t1. The older the toner gets, the more the xerographic process control suffers. This condition could manifest itself as background, i.e. toner particles appearing in unexpected areas of the page. Since there is insufficient space available to insert the patches, PWR does not occur for sheets with a cross process dimension larger than a threshold value. In ATP purging, printing of customer images is interrupted and purge sheets containing toner patches are printed. The sheets are delivered to a purge destination and the customer is instructed to discard them. This behavior is situational and is triggered by the average age of toner in the developer sump exceeding a threshold, t2, where t2>t1. Since currently there is no selectivity, all four toners are simultaneously purged.

As mentioned hereinabove an accurate estimation must incorporate additional sources of toner usage or the job and engine dependent parameters (e.g., printing banner pages and wastage) which must be ascertained and summed with the total toner usage for each page in order to determine the final estimate of toner (STEPS 250-260).

Figure 3:
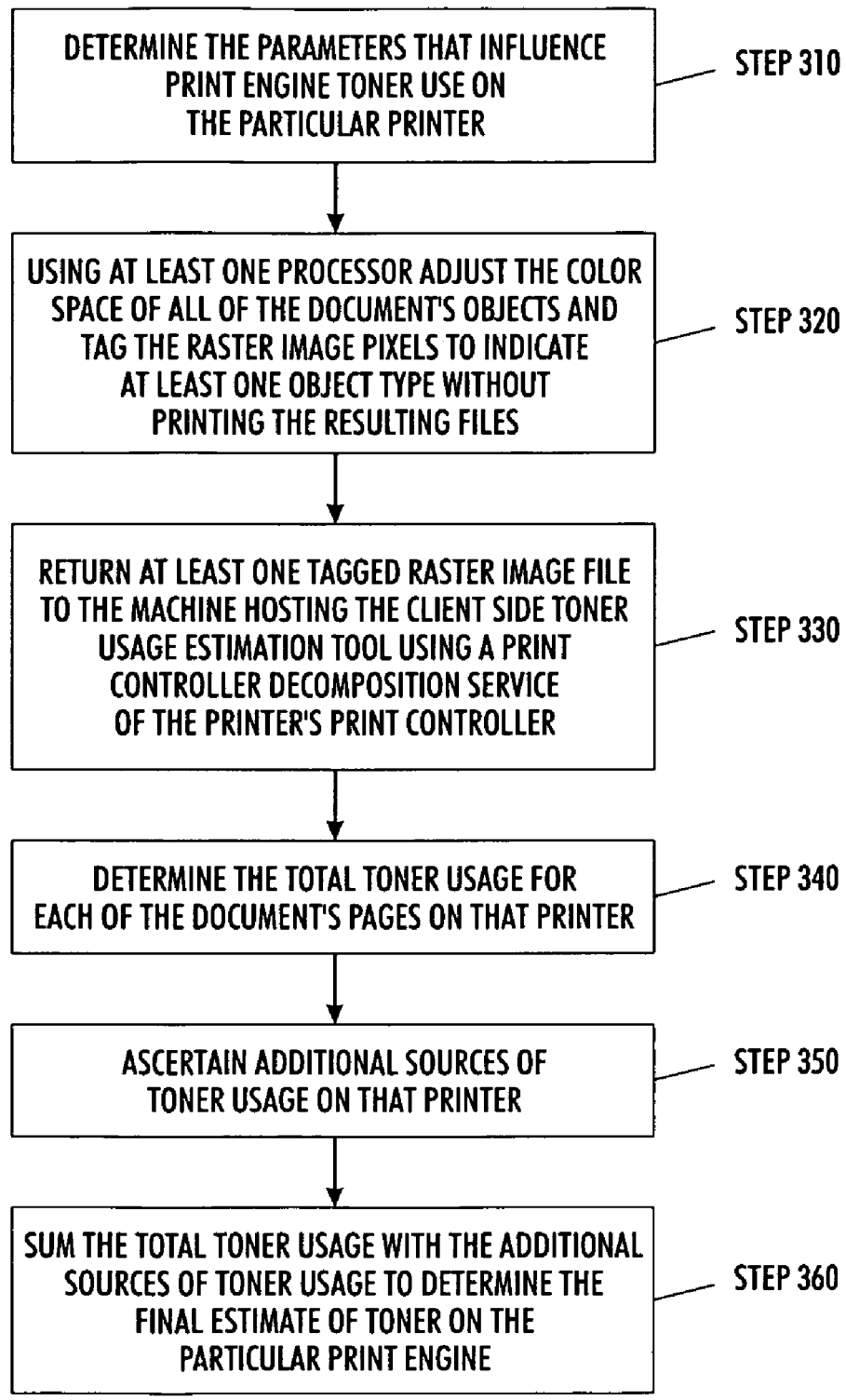
FIG. 3 is a flow chart of the present disclosure showing an alternative method for estimating client side toner usage utilizing a print controller side decomposition service.

For those print controllers that providing a decomposition service, an alternative embodiment is envisioned. A decomposition service is a process where print jobs are interpreted, rasterized for a specific print device and the results saved in an industry standard, compressed file format such as TIFF or JFIF. A flow chart in accordance with this embodiment is shown in FIG. 3. In order to print a job, a print controller processes submissions in a range of formats (e.g., page description languages such as PostScript, PDF, PCL, raster image files such as JPEG's or TIFF's, ASCII files, etc.) into device dependent raster images that can be used to drive a print engine. Some print controllers provide a facility known as the decomposition service whereby these fully rendered, targeted raster images can be exported from the print controller for storage on or reuse by other system components.

Since these decomposition service images fully reflect the actual way in which the job's pages will be printed (i.e., they have been fully rendered into the target printer's CMYK or monochrome) they can be fed back to a client side toner usage estimation tool. The pixels of each decomposed image are examined and the color values are determined. The values are mapped into the corresponding toner usage for this specific print engine. Then these resulting amounts are summed together to yield the total toner usage. In addition to using specific print controller information when rendering the job into a corresponding raster image, specific print engine marking information is used in determining the number of nanograms of toner which will actually be used to print the pixel.

According to this embodiment of the present disclosure a print controller side decomposition service using a client side toner usage estimation tool is provided. As mentioned hereinabove, it is necessary to take into account the parameters that influence print engine toner use for such xerographic process controls as toner purging, photoreceptor tracking, etc. (STEP 310). If the halftoning has been performed in the print controller itself and already incorporated into the raster image, then the pixel examination and mapping to print engine toner usage can be directly performed without further processing on the raster image.

Instead of utilizing software methodologies as mentioned in the previous embodiment, this embodiment utilizes at least one processor which is configured to create at least one raster image file and convert the at least one raster image file to the print engine color space (STEP 320). More specifically, the print controller is used to raster image process the submission to raster image files to the print engine color space (either monochrome or device CMYK). The raster image pixels may be tagged to indicate their object type (e.g., text, graphics, images, etc.). Using the print controller decomposition service, the tagged raster image files are returned to the machine hosting the client side toner usage estimation tool (STEP 330). At this point, the total toner usage for each page must be determined as described above (STEP 340). As mentioned hereinabove, additional sources of toner usage (such as calibration copies, banner pages, system purging and wastage) must also be ascertained (STEP 350). These additional sources of toner usage not directly tied to print copy production can significantly affect the final estimate of toner therefore estimation accuracy requires calculation of such consumption.

The summation of these values results in the final estimate of toner which provides a more accurate estimation of actual toner consumption because the algorithm takes into account the characteristics of the print controller and the print engine (STEP 360).

Figure 4:
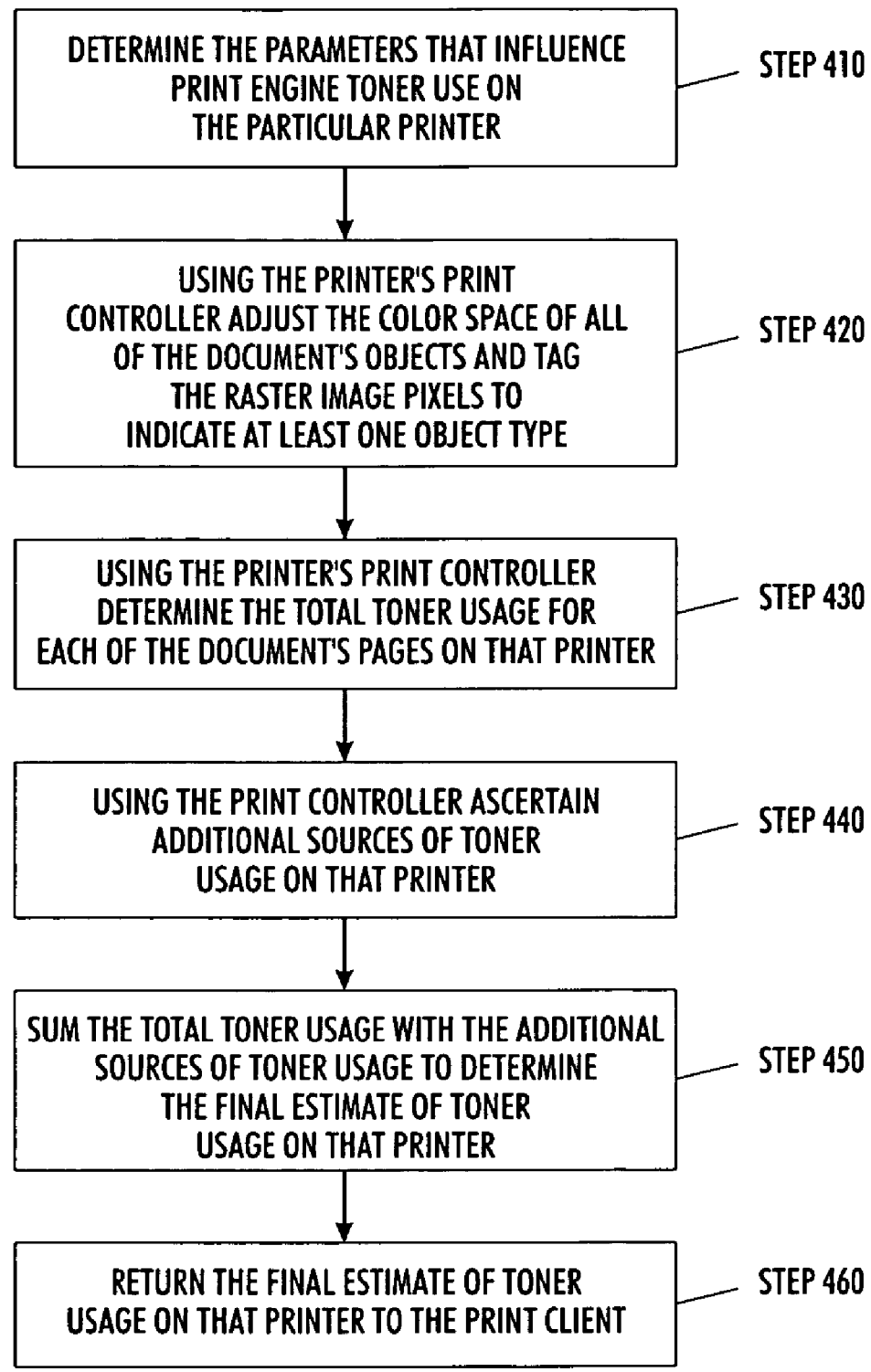
FIG. 4 is a flow chart of the present disclosure showing yet another alternative method for estimating print controller side toner usage for a print job to be performed by a printing system in accordance with the present disclosure.

According to another embodiment of the present disclosure, the toner estimation may be performed completely by software at the print controller with only the final toner estimate being returned to the client side as shown in FIG. 4. In this embodiment, a job is submitted to the print controller for estimation processing and optionally for printing. It is rendered and rasterized as if it were to be printed. At this point the toner usage estimation software is invoked. Because each of the fully rendered and rasterized images accurately reflects what will actually be printed, these images can be used to determine actual toner usage. To do so, as with the previous embodiments, virtual pixel values must be mapped into actual printer toner usage. This requires empirical data on the target print engine, yielding the physical device's toner consumption.

Jobs submitted for toner usage estimation will be disposed in accordance with a user or shop policy. The policy may be administered by the repository holding the rasterized pages, this is typically the print controller. If the decision to proceed with production printing is made in a timely manner, it is desirable to preserve the results of rasterizing the job for printing. In many situations, a timely decision is not possible, e.g. a print shop customer seeking an estimate for a potential print job or a job being priced for both digital and offset printing.

The parameters that influence print engine toner use must be determined as mentioned in the previous embodiments (STEP 410). As mentioned hereinabove, one of the parameters that affects toner usage and estimation is halftoning. If the halftoning is performed in the print controller itself and already incorporated into the raster image, then the pixel examination and mapping to print engine toner usage can be directly performed without further processing on the raster image. Alternatively, if the actual halftoning is only performed by hardware circuitry contained within the print engine itself, the toner usage estimator requires that the effects of such halftoning must first be modeled, only after which the pixel examination and mapping to the print engine toner will be performed.

As mentioned in the previous embodiments, any accurate toner usage estimation tool must account for additional sources of toner usage or the job and engine dependent parameters (such as calibration copies, banner pages, system purging and wastage). Such indirect toner usage not directly tied to print copy production can significantly affect the final estimate of toner.

According to this embodiment of the present disclosure, a print controller side toner usage estimation tool is provided. Instead of utilizing software methodologies or the print controller decomposition service as mentioned in the previous embodiments, this embodiment utilizes at least one processor which is configured to create at least one raster image file and convert the at least one raster image file to the print engine color space (STEP 420). More specifically, the print controller is used to raster image process the submission to raster image files to the print engine color space (either monochrome or device CMYK). The raster image pixels are then tagged to indicate their object type (e.g., text, graphics or images). Moreover, the total toner usage for each page must be determined using at least one processor which may be, e.g., the print controller. This differs from the embodiments described above. The additional sources of toner usage (i.e., printing banner pages and wastage) must be ascertained and summed with the total toner usage for each page in order to calculate the final estimate of toner as described in the prior embodiment (STEPS 430-450). This final toner estimate is then returned to the print client (STEP 460). This final estimate of toner will provide a more accurate estimation of actual toner consumption because the algorithm takes into account the characteristics of the print controller and the print engine. It is envisioned that for this embodiment all of these steps are performed using at least one processor, e.g., on the print controller.

The techniques described above may be used in conjunction with a printing system for estimating toner usage. The system includes selecting a printing system and a printing parameter to be modeled. Possible printing systems may include, but are not limited to, the print station (marking engine) and the Digital Front End or Raster Image Processor. Possible printing parameters include, but are not limited to, halftone selection, anti-aliasing selection, etc. as discussed hereinabove. These parameters are then analyzed to determine which parameters are the most relevant for a particular print controller or print engine. A model which predicts toner usage is created using these parameters. Once the model has been created it may be used to predict the toner usage of another job on another printing system. That is, a data file may be provided which extends or adds the estimation ability of the original printing system to the second printing system.

Although, this disclosure has focused upon xerographic toner consumption, it should be noted that it can be readily extended for use in estimating other sorts of marker consumables for other types of printing devices, e.g., liquid ink in offset presses, ink jet printer inks, dye sublimation printer inks, etc. In particular, it should be noted that the occasionally marking consumable is referred to as replenisher (a combination of toner and carrier) rather than toner. This disclosure and the word "toner" as used herein intends to encompass the marker consumables listed above as well as others known in the art.

This algorithm is most easily applied to PDF print submission, however, it can readily support other page description languages (such as PostScript or PCL) simply by their conversion into PDF. In order to support the application of halftoning and mapping to print engine toner usage, the algorithm leverages the object type of the submission file components.

It is also envisioned and within the scope of the present disclosure for the toner usage estimation tool to distinguish between different classes of toner usage and allow customer determination of whether such consumption is billable. For example, while determining total toner consumption requires projecting all toner usage (including, e.g., banner pages), a print shop may choose not to incorporate all such usage into job costing. The present disclosure supports such flexibility. Moreover, as opposed to estimating toner usage based solely upon a percentage of area coverage, the present disclosure is intended to allow the determination of quantities of different toners, allowing appropriate differential costing of each toner.

This disclosure can be used to estimate the toner usage of monochrome, four color contone xerographic printers, highlight color xerographic printers as well as for xerographic printers supporting additional colorants (e.g., use of a fifth gamut-extending color such as orange or green or a specific important spot color. This disclosure may also be used to estimate the toner usage for clear coatings applied to prints, such as varnishes or coatings applied to protect the surface or control gloss.

The term "print controller" as used herein refers to the software/hardware system component that receives job submissions consisting of Page Description Language files and job tickets, processes the PDL submissions into raster images, submits those raster images to the print engine for printing, gathers accounting information, etc. The term "print engine" as used herein refers to the unit within the printer that actually does the printing (i.e., takes pieces of paper and puts marks on those sheets of paper). Print engines can optionally contain finishers to staple, bind, punch, etc. the printed sheets.

It is envisioned that the method of the present disclosure may be hosted on a range of different client machines, e.g., the machine hosting the print submission client, the machine hosting an output management system, or an entirely different client side machine. This disclosure is intended to encompass all of these possible variations. Furthermore, references to print controller processing as mentioned herein, refers to both virtual printer job queue settings as well as job ticket color adjustments.

It should be noted that the method described in the embodiments above is used to create a model of the characteristics of a particular printer, printer controller, print engine or the like.

Imaging adjustments are commonly specified in a document's job ticket but also can be specified as part of the print controller or print controller queue settings. These adjustments are independent of such features as tone reproduction curve (TRC) modification. These adjustments could have a significant impact, both on monochrome and on contone printers. Possible controls include, but are not limited to, darkness/lightness, saturation, contrast, color cast (i.e., the color balance between blue/yellow, magenta/green, and cyan/red) and toner saver (modifies the imaging to reduce toner usage).

The term "print conditions" as used herein is meant to capture all the settings/selections/parameters that affect toner usage. They can be specified using a variety of mechanisms: system settings, queue defaults or override values, job ticket programming, embedded processing instructions (e.g. PostScript SetPageDevice), and exception page programming in the job ticket. It is envisioned that the toner usage model can be responsive to the set of print conditions regardless of which mechanism is used or how they interact. "Print conditions" include all of the image rendering parameters (i.e., trapping, halftoning, anti-aliasing, UGR/GCR, toner saver mode, etc.), job dependent or engine dependent parameters (i.e., monochrome vs. color printing, simplex vs. duplex, media used) as well as color management controls (i.e., gamut mapping, conversion to device colorspace, spot color conversions to device colorspace, user selectable TRC's, etc.).

It will be appreciated that several of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. A method for determining a toner usage estimate for a print job to be performed by a printing system having at least two print engines, each of the at least two print engines having at least one corresponding controller, the method comprising:
    determining a set of print conditions for the print job;
    selecting a set of parameters associated with the print conditions;
    determining a second set of parameters from the set of parameters such that the determined second set of parameters substantially influence toner usage on a print engine of the printing system; and
    estimating a total amount of toner usage for at least one page of a print job utilizing the determined second set of parameters by determining which at least one of the second set of parameters most influences toner usage for a particular print engine of the printing system,
    wherein the second set of parameters includes job dependent and engine dependent parameters, the job and engine dependent parameters including system purging and photoreceptor position tracking.

2. A method for determining a toner usage estimate according to claim 1, further comprising the step of adjusting a color space of the at least one page in accordance with the set of parameters.

3. A method for determining a toner usage estimate according to claim 2, further comprising the step of scaling the at least one page to an actual output size and using a raster image processor to generate information about at least one page generating the pixels.

4. A method for determining a toner usage estimate according to claim 3, wherein the step of adjusting is performed using modeling software, the modeling software configured to model a target printer controller of the printing system.

5. A method for determining a toner usage estimate according to claim 1, further comprising the step of ascertaining additional sources of toner usage and summing the additional sources of toner usage and the total toner usage to determine a final estimate of toner usage.

6. A method for determining a toner usage estimate according to claim 1, further comprising the step of determining how at least one page having a contone color space will be halftoned and a toner amount the at least one page will consume during printing by the printing system.

7. A method for determining a toner usage estimate according to claim 1, wherein the step of determining further includes determining the parameters of at least one object on the page, the at least one object selected from the group consisting of text, line art, vector graphics, and raster images.

8. A method for determining a toner usage estimate according to claim 1, wherein the color space of the at least one page is adjusted to the device color space.

9. A method for determining a toner usage estimate according to claim 1, wherein the set of parameters includes image rendering parameters, the image rendering parameters including one of halftoning, color space adjustment, trapping, antialiasing, scaling and imaging adjustments or combinations thereof.

10. A method for determining a toner usage estimate according to claim 1, wherein the job and engine dependent parameters further include one of calibration copies, banner pages, simplex vs. duplex and wastage or combinations thereof.

11. A method for determining a toner usage estimate according to claim 1, wherein the printing toner is selected from the group consisting of xerographic dry ink, liquid ink, ink jet printer inks, dye sublimation printer inks, replenisher, transparent and non-colorized coatings or mixtures.

12. A method for determining a toner usage estimate for a print job to be performed by a printing system having at least two print engines, comprising:
    providing a computer-readable storage medium storing a set of instructions capable of being executed by at least one processor of the printing system;
    determining a set of parameters that influence toner usage for a print engine of the printing system;
    determining a second set of parameters from the set of parameters such that the determined second set of parameters substantially influence toner usage on a print engine of the printing system;

analyzing at least one page in accordance with at least one of the set of parameters and the second set of parameters; and estimating a total amount of toner usage for the at least one page utilizing the second set of parameters by determining which at least one of the second set of parameters most influences toner usage for a particular print engine of the printing system, the second set of parameters including job dependent and engine dependent parameters, the job and engine dependent parameters including system purging, and photoreceptor position tracking.

13. A method according to claim 12, further comprising the step of scaling the at least one page to an actual output size and using a raster image processor to preserve information about the at least one page generating the pixels.

14. A method according to claim 12, wherein the step of analyzing includes adjusting the color space of at least one object on the page.

15. A method according to claim 14, wherein the at least one object is selected from the group consisting of text, line art, vector graphics, and raster images, wherein the step of adjusting the color space of at least one object on the page is performed by one of:

adjusting the color space of text;

adjusting the color space of line art;

adjusting the color space of vector graphics; and adjusting the color space of raster images.

16. A method according to claim 12, wherein the steps of determining involve determining image rendering parameters and job and engine dependent parameters.

17. In a printing system for estimating toner usage having at least two print engines, each print engine having at least one corresponding print controller, a method for estimating toner usage comprising:

selecting a print system and a printing behavior to be modeled;

determining a set of parameters that influence toner usage for the selected print system and printing behavior;

analyzing the set of parameters to determine which parameters are most relevant for a particular print controller or print engine;

determining a second set of parameters from the set of parameters such that the determined second set of parameters substantially influence toner usage for the particular print controller or the print engine; and utilizing the second set of parameters to create a toner usage model by determining which at least one of the second set of parameters most influences toner usage for a particular print engine of the printing system, wherein the second set of parameters includes system purging and photoreceptor position tracking.

18. The method according to claim 17, further comprising the step of using the toner usage model to estimate toner usage of another print system having at least one print engine.

19. The method according to claim 17, wherein the method steps performed by the print system are performed by one of a marking engine, a digital front end processor and a raster image processor.

* * * * *